3,122,472
Patented Feb. 25, 1964

3,122,472
1-ORGANOMERCURITHIO-2-MERCAPTO-1,2-DICYANOETHYLENE MICROBIOCIDES
Richard S. Waritz, Wilmington, Del., assignor to E. I. du Pont de Nemours and Company, Wilmington, Del., a corporation of Delaware
No Drawing. Filed Apr. 21, 1960, Ser. No. 23,642
10 Claims. (Cl. 167—22)

This invention relates to novel 1-organomercurithio-2-mercapto-1,2-dicyanoethylene derivatives and to their use as microbiocides, especially as fungicides, for the treatment of plants, seeds, and soil.

The compounds of this invention are of the formula—

(1)     $R_1Hg—S—(CN)C=C(CN)—S—R_2$ where $R_1$ is a cyclic or an acyclic substituted or unsubstituted organic radical containing from 1 to 12 carbon atoms, and $R_2$ is $R_1$, $R_1Hg$, $R_1Hg—S—(CN)C=C(CN)—S—$, —S—$CCl_3$, or a metal ion, ammonium ion, or a mono-, di-, or trialkyl substituted ammonium ion containing a total of from 1 to 12 carbon atoms.

By metal ion is meant such ions at $Na^+$, $K^+$, $Ba^{++}$, $Fe^{++}$, $Fe^{+++}$, $Ca^{++}$, $Mn^{++}$, $Mg^{++}$, $Cu^{++}$, $Cd^{++}$, $Zn^{++}$, $Co^{++}$, $Ni^{++}$, and $Cr^{+++}$.

The cyclic or acyclic organic radicals at the $R_1$ position can be but are not limited to such radicals as methyl, ethyl, propyl, isopropyl, phenyl, p-tolyl, dodecyl, butyl, propargyl, butenyl, isobutyl, t-butyl, hexyl, octyl, nonyl, sec.-nonyl, cyclohexyl, cyclopentyl, cyclopentenyl, cycloheptyl, 2-methoxyethyl, 2-nitroethyl, 2-aminoethyl, 2-cyanoethyl, allyl, cinnamyl, p-chlorophenyl, 3,4-dichlorophenyl, 2-aminophenyl, 5-chloro-2-aminophenyl, 2-hydroxyphenyl, 3-nitrophenyl, and 2-nitro-3-chlorophenyl.

The preferred compounds of this invention are those where $R_1$ is an aliphatic monovalent organic radical containing from 1 to 12 carbon atoms, a cycloaliphatic monovalent organic radical containing from 3 to 8 carbon atoms, an aromatic monovalent organic radical containing from 6 to 8 carbon atoms, or any of these radicals which are substituted with 1 or 2 chlorine, hydroxy, or nitro groups; and $R_2$ is $R_1$, $R_1Hg—$, $R_1Hg—S—(CN)C=C(CN)—S—$, a monovalent metal ion, or a divalent metal ion.

Still more preferred because of their outstanding activity as seed disinfectants for small grains are the compounds of this invention where $R_1$ is an alkyl, alkenyl, or alkynyl radical containing from 1 to 3 carbon atoms, and $R_2$ is $R_1$, $R_1Hg$, $R_1Hg—S—(CN)C=C(CN)—S—$, a mono- or divalent metal ion, or an ammonium or alkyl-substituted ammonium ion.

Most preferred for their low cost of preparation and their stability when formulated into the compositions of this invention are those compounds where $R_1$ is an alkyl radical containing from 1 to 3 carbon atoms, and $R_2$ is $R_1$, $R_1Hg$, or $R_1Hg—S—(CN)C=C(CN)—S—$.

No attempt has been made to determine the extent of cis, trans isomer-equilibrium which theoretically exists for these compounds.

Illustrative of the compounds of this invention are 1-methylmercurithio-2-methylmercurithio-1,2-ethylenedicarbonitrile
1-methylmercurithio-2-ethylmercurithio-1,2-ethylenedicarbonitrile
1-methylmercurithio-2-isopropylmercurithio-1,2-ethylenedicarbonitrile
1,1'-dithiobis[2-methylmercurithio-1,2-ethylenedicarbonitrile]
1-methylmercurithio-2-methylthio-1,2-ethylenedicarbonitrile
1-methylmercurithio-2-ethylthio-1,2-ethylenedicarbonitrile
1-methylmercurithio-2-propylthio-1,2-ethylenedicarbonitrile
1-methylmercurithio-2-isopropylthio-1,2-ethylenedicarbonitrile
1-methylmercurithio-2-allylmercurithio-1,2-ethylenedicarbonitrile
1-methylmercurithio-2-allylthio-1,2-ethylenedicarbonitrile
1-methylmercurithio-2-mercapto-1,2-ethylenedicarbonitrile, ammonium salt
1-methylmercurithio-2-mercapto-1,2-ethylenedicarbonitrile, sodium salt
1-methylmercurithio-2-mercapto-1,2-ethylenedicarbonitrile, methylammonium salt
1-methylmercurithio-2-mercapto-1,2-ethylenedicarbonitrile, dimethylammonium salt
1-methylmercurithio-2-mercapto-1,2-ethylenedicarbonitrile, 1/2 zinc salt
1-methylmercurithio-2-mercapto-1,2-ethylenedicarbonitrile, cupro salt
1-methylmercurithio-2-mercapto-1,2-ethylenedicarbonitrile, 1/2 mangano salt
1-methylmercurithio-2-mercapto-1,2-ethylenedicarbonitrile, 1/2 cadmium salt
1-methylmercurithio-2-mercapto-1,2-ethylenedicarbonitrile, 1/2 nickelo salt
1-methylmercurithio-2-phenylmercurithio-1,2-ethylenedicarbonitrile
1-methylmercurithio-2-p-tolylmercurithio-1,2-ethylenedicarbonitrile
1-methylmercurithio-2-butylmercurithio-1,2-ethylenedicarbonitrile
1-methylmercurithio-2-isobutylmercurithio-1,2-ethylenedicarbonitrile
1-methylmercurithio-2-t-butylmercurithio-1,2-ethylenedicarbonitrile
1-methylmercurithio-2-hexylmercurithio-1,2-ethylenedicarbonitrile
1-methylmercurithio-2-nonylmercurithio-1,2-ethylenedicarbonitrile
1-methylmercurithio-2-sec.-nonylmercurithio-1,2-ethylenedicarbonitrile
1-methylmercurithio-2-cyclohexylmercurithio-1,2-ethylenedicarbonitrile
1-methylmercurithio-2-(2-nitroethyl)mercurithio-1,2-ethylenedicarbonitrile
1-methylmercurithio-2-cinnamylmercurithio-1,2-ethylenedicarbonitrile
1-methylmercurithio-2-(p-chlorophenyl)mercurithio-1,2-ethylenedicarbonitrile
1-methylmercurithio-2-(3,4-dichlorophenyl)mercurithio-1,2-ethylenedicarbonitrile
1-methylmercurithio-2-(3-chloro-4-hydroxyphenyl)mercurithio-1,2-ethylenedicarbonitrile
1-methylmercurithio-2-(2-hydroxyphenyl)mercurithio-1,2-ethylenedicarbonitrile
1-methylmercurithio-2-(3-nitrophenyl)mercurithio-1,2-ethylenedicarbonitrile
1-methylmercurithio-2-(3-nitro-4-hydroxyphenyl)mercurithio-1,2-ethylenedicarbonitrile
1-methylmercurithio-2-(2-nitro-3-chlorophenyl)mercurithio-1,2-ethylenedicarbonitrile
1-methylmercurithio-2-butylthio-1,2-ethylenedicarbonitrile
1-methylmercurithio-2-isobutylthio-1,2-ethylenedicarbonitrile 1-methylmercurithio-2-t-butylthio-1,2-ethylenedicarbonitrile
1-methylmercurithio-2-hexylthio-1,2-ethylenedicarbonitrile
1-methylmercurithio-2-nonylthio-1,2-ethylenedicarbonitrile
1-methylmercurithio-2-sec.-nonylthio-1,2-ethylenedicarbonitrile
1-methylmercurithio-2-cyclohexylthio-1,2-ethylenedicarbonitrile
1-methylmercurithio-2-(2-nitroethyl)thio-1,2-ethylenedicarbonitrile
1-methylmercurithio-2-(2-hydroxyethyl)thio-1,2-ethylenedicarbonitrile
1-methylmercurithio-2-benzylthio-1,2-ethylenedicarbonitrile
1-methylmercurithio-2-(p-chlorobenzyl)thio-1,2-ethylenedicarbonitrile
1-methylmercurithio-2-cinnamylthio-1,2-ethylenedicarbonitrile
1-methylmercurithio-2-(3,4-dichlorobenzyl)thio-1,2-ethylenedicarbonitrile
1-methylmercurithio-2-(2-methoxyethylmercuri)thio-1,2-ethylenedicarbonitrile
1-methylmercurithio-2-(2-aminoethyl)mercurithio-1,2-ethylenedicarbonitrile
1-methylmercurithio-2-(2-cyanoethyl)mercurithio-1,2-ethylenedicarbonitrile
1-methylmercurithio-2-(2-aminophenyl)mercurithio-1,2-ethylenedicarbonitrile
1-methylmercurithio-2-(5-chloro-2-aminophenyl)mercuri-1,2-ethylenedicarbonitrile
1-methylmercurithio-2-(2-methoxyethyl)thio-1,2-ethylenedicarbonitrile
1-methylmercurithio-2-(2-aminoethyl)thio-1,2-ethylenedicarbonitrile
1-methylmercurithio-2-(2-cyanoethyl)thio-1,2-ethylenedicarbonitrile
1-methylmercurithio-2-acetylthio-1,2-ethylenedicarbonitrile
1-methylmercurithio-2-trichloromethyldithio-1,2-ethylenedicarbonitrile
1-methylmercurithio-2-ethylacetylthio-1,2-ethylenedicarbonitrile
1-methylmercurithio-2-cyanomethylthio-1,2-ethylenedicarbonitrile
1-methylmercurithio-2-($\beta$-chloro-carbethoxy)thio-1,2-ethylenedicarbonitrile
1-methylmercurithio-2-(N,N-dimethylcarbamyl)thio-1,2-ethylenedicarbonitrile
1-methylmercurithio-2-mercapto-1,2-ethylenedicarbonitrile, 1/3 ferri salt
1-methylmercurithio-2-mercapto-1,2-ethylenedicarbonitrile, 1/3 cobalti salt
1-methylmercurithio-2-mercapto-1,2-ethylenedicarbonitrile, 1/3 chromi salt
1-ethylmercurithio-2-ethylmercurithio-1,2-ethylenedicarbonitrile
1-ethylmercurithio-2-phenylmercurithio-1,2-ethylenedicarbonitrile
1-phenylmercurithio-2-phenylmercurithio-1,2-ethylenedicarbonitrile
1-allylmercurithio-2-allylmercurithio-1,2-ethylenedicarbonitrile
1-allylmercurithio-2-ethylmercurithio-1,2-ethylenedicarbonitrile
1-allylmercurithio-2-cyclohexylmercurithio-1,2-ethylenedicarbonitrile
1-ethylmercurithio-2-allylthio-1,2-ethylenedicarbonitrile
1-ethylmercurithio-2-(2-hydroxyethyl)thio-1,2-ethylenedicarbonitrile
1-allylmercurithio-2-allylthio-1,2-ethylenedicarbonitrile
1-ethylmercurithio-2-trichloromethyldithio-1,2-ethylenedicarbonitrile
1-phenylmercurithio-2-phenylmercurithio-1,2-ethylenedicarbonitrile
1-phenylmercurithio-2-trichloromethyldithio-1,2-ethylenedicarbonitrile
1-phenylmercurithio-2-allylmercurithio-1,2-ethylenedicarbonitrile
1-phenylmercurithio-2-allylthio-1,2-ethylenedicarbonitrile
1-phenylmercurithio-2-(2-hydroxyethyl)thio-1,2-ethylenedicarbonitrile
1-phenylmercurithio-2-cyclohexylmercurithio-1,2-ethylenedicarbonitrile
1-phenylmercurithio-2-cyclohexylthio-1,2-ethylenedicarbonitrile
1-cyclohexylmercurithio-2-ethylmercurithio-1,2-ethylenedicarbonitrile
1-cyclohexylmercurithio-2-cyclohexylmercurithio-1,2-ethylenedicarbonitrile
1-cyclohexylmercurithio-2-allylthio-1,2-ethylenedicarbonitrile
1-cyclohexylmercurithio-2-(2-hydroxyethyl)thio-1,2-ethylenedicarbonitrile
1-cyclohexylmercurithio-2-ethylthio-1,2-ethylenedicarbonitrile
1-cyclohexylmercurithio-2-cyclohexylthio-1,2-ethylenedicarbonitrile
1-cyclohexylmercurithio-2-trichloromethyldithio-1,2-ethylenedicarbonitrile
1-cyclohexylmercurithio-2-mercapto-1,2-ethylenedicarbonitrile, ammonium salt
1-cyclohexylmercurithio-2-mercapto-1,2-ethylenedicarbonitrile, 2:1 zinc salt
1-cyclohexylmercurithio-2-mercapto-1,2-ethylenedicarbonitrile, 2:1 mangano salt
1-ethylmercurithio-2-mercapto-1,2-ethylenedicarbonitrile, ammonium salt
1-ethylmercurithio-2-mercapto-1,2-ethylenedicarbonitrile, methylammonium salt
1-ethylmercurithio-2-mercapto-1,2-ethylenedicarbonitrile, dimethylammonium salt
1-ethylmercurithio-2-mercapto-1,2-ethylenedicarbonitrile, 2:1 zinc salt
1-ethylmercurithio-2-mercapto-1,2-ethylenedicarbonitrile, 2:1 mangano salt
1-ethylmercurithio-2-mercapto-1,2-ethylenedicarbonitrile, 2:1 cadmium salt
1-ethylmercurithio-2-mercapto-1,2-ethylenedicarbonitrile, 2:1 nickelo salt
1-ethylmercurithio-2-mercapto-1,2-ethylenedicarbonitrile, cupro salt
1-ethylmercurithio-2-mercapto-1,2-ethylenedicarbonitrile, 3:1 ferri salt
1,1'-dithiobis[2-ethylmercurithio-1,2-ethylenedicarbonitrile]
1,1'-dithiobis[2-allylmercurithio-1,2-ethylenedicarbonitrile]
1,1'-dithiobis[2-cyclohexylmercurithio-1,2-ethylenedicarbonitrile]
1,1'-dithiobis[2-phenylmercurithio-1,2-ethylenedicarbonitrile]

The compounds of this invention can be prepared according to the following procedure:

Sodium cyanodithioformate is prepared by the reaction of sodium cyanide and carbon disulfide in dimethylformamide and isobutanol, according to this equation:

(2)
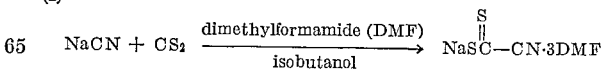

1,2 - dimercapto - 1,2-ethylenedicarbonitrile, disodium salt is then prepared by the spontaneous coupling of this sodium cyanodithioformate in water or chloroform at room temperature, according to the following equation:

(3)
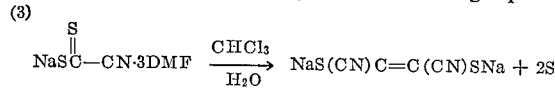

This disodium salt is then reacted with a suitable organomercuri salt, as indicated in the following equation.

In this equation and those which follow it, $R_1$ and $R_2$ have the same scope as in Formula 1; X is an anion such as acetate or halide; and M is a metal ion, an ammonium ion, or a substituted ammonium ion.

(4) $NaS(CN)C=C(CN)SNa + R_1HgX \rightarrow$
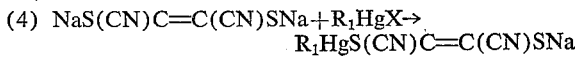
$R_1HgS(CN)C=C(CN)SNa$

This monosodium salt is then reacted according to the following equation to give the desired product:

(5)

$R_1HgS(CN)C=C(CN)SNa \xrightarrow[CH_3OH]{M} R_1HgS(CN)C=C(CN)SM$

This reaction is carried out on a nuclear sulfonated styrene base ion exchange resin, in the proper ionic form. Such resins as "Amberlite" IR–120® produced by the Rohm and Haas Co., and "Dowex" 50®, produced by the Dow Chemical Co., are preferred, but any strongly acidic ion exchange resin is satisfactory.

The exact amount of resin employed depends on the physical and chemical characteristics of the resin. Generally, however, a ratio of .25 milliequivalent of ion to be exchanged per milliequivalent of resin is used to insure adequate exchange capacity.

A desired weight or volume of resin is charged into a water-filled column. The resin is then converted to the desired ionic form by cycling through 18 volumes of an aqueous solution which is 3% in the desired ionic species. In this cycling step and in all other subsequent cycling steps, the cycling is carried out at a rate of 0.1 column volume (wet resin volume) per minute. The resin is then cycled with 76 column volumes of water to remove any ionic species not bound to the resin.

If the monosodium salt produced in Equation 4 is in aqueous solution, no further column preparation is necessary, and the reaction mixture can be cycled through the column directly, followed by 2 column volumes of water.

When Equation 4 is run in a nonaqueous solvent such as anhydrous methanol, the sodium halide side-product precipitates and should be filtered off, thus removing these ions from competition with the ions bound to the exchange resin. If Equation 4 is run in a nonaqueous solvent, it is necessary to further cycle the resin with 2 volumes of the solvent used in Equation 4. The filtered reaction solution of Equation 4 is then cycled through the column followed by 1 column volume of solvent and 1 column volume of water. The reaction effluents and wash effluents are collected, pooled, and then concentrated or diluted as desired.

The rate of ion exchange is, of course, proportional to the temperature. It can proceed at any temperature from 4° C. to 60° C., but is most conveniently carried out at room temperature. The concentration of influent solutions can vary from .1 to .5 molar.

The monosodium salt produced according to Equation 4 can also be converted to compounds of this invention according to the following equations:

(6) $R_1HgS(CN)C=C(CN)SNa + R_2X \rightarrow$
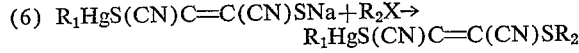
$R_1HgS(CN)C=C(CN)SR_2$ (7) $R_1HgS(CN)C=C(CN)SNa + R_1HgX \rightarrow$
$R_1HgS(CN)C=C(CN)SHgR_1$ (8) $R_1HgS(CN)C=C(CN)SNa + MX \rightarrow$
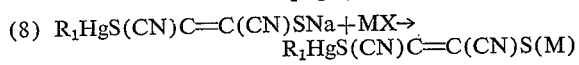
$R_1HgS(CN)C=C(CN)S(M)$ These reactions are run in such solvent media as water, ethyl alcohol, benzene, toluene, xylene, or unsymmetrical dimethoxy ethane. A solvent in which either the desired compound or the unreacted starting materials and secondary reaction products are soluble, but not both, should be chosen since this simplifies separation and purification of the desired product.

The reactions of Equations 6, 7, and 8 are carried out by dissolving the monosodium salt in a suitable solvent and then adding the second reactant dropwise, with stirring. Stirring is continued for about ½ hour, and the desired product is separated. The reactants should be present in equivalent amounts to facilitate purification of the desired product. The reaction proceeds satisfactorily, however, if an excess of the $R_2X$, $R_1HgX$, or MX reactants is used. These reactions are ordinarily run at room temperature, but temperatures of from 0° C. to 60° C. can be used without seriously affecting the yield. The time required for completion of these reactions will, of course, vary according to the temperature and solvent used. Generally, however, a reaction time of about one hour is sufficient.

The product of Equation 4 can also be converted to a compound of this invention, according to the following reaction:

(9)

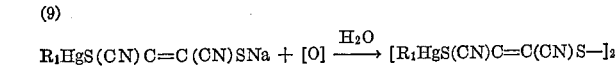
$R_1HgS(CN)C=C(CN)SNa + [O] \xrightarrow{H_2O} [R_1HgS(CN)C=C(CN)S-]_2$ This oxidation reaction can be carried out with such commonly used oxidizing agents as air, oxygen, ammonium persulfate, or hydrogen peroxide.

When air or oxygen is used, the oxidation is accomplished by bubbling the gas through a solution of the monosodium salt at temperatures of from 4° C. to 60° C. Ambient temperature is preferred because of its convenience. The gas is bubbled through the reaction mixture until no further precipitate forms, which generally takes from 3 to 6 hours.

When ammonium persulfate is used as the oxidizing agent, an aqueous solution of ammonium persulfate is added dropwise with stirring to a solution containing the alkyl mercurimercaptide. A 20% excess of persulfate, on an equivalent basis, is used and stirring is continued for from ¼ to ¾ hour after addition is complete. The reaction is conducted at a temperature of about 20° C. Temperatures as low as 4° C. or as high as 65° C. can be used, but side reactions occur at the higher temperatures and the reaction is quite slow at lower temperatures. In Equations 5, 6, 7, 8, and 9, if the solvent medium selected is one in which the desired product is soluble and in which the starting reactants and reaction by-products are insoluble, the desired product can be readily separated by filtering off the undesirable materials and removing the solvent from the filtrate in vacuo to yield a product which is substantially pure. If this material is a solid, it can be further purified by conventional recrystallization procedures from such solvents as toluene, acetonitrile, or 1,1,1-trichloroethane. If the material is liquid, a treatment with decolorizing carbon at a temperature of below 60° C. will give adequate purification of the product.

If, however, the desired product is insoluble in the solvent medium, it can be isolated in a highly pure state by simply removing the solvent by filtration and then slurrying and washing the desired product with more solvent. If necessary, this material can be recrystallized from such solvents as toluene, acetonitrile, or 1,1,1,-trichloroethane to give a purer product.

In preparing some compounds of this invention, it is not possible to choose a solvent with the desired solubilizing characteristics necessary to make purification easier. In such instances, the compounds can still be purified by filtering or evaporating the solvent medium in vacuo, but it will be necessary to employ several recrystallizations to obtain the desired degree of purity, and this of course, results in a decrease in yield.

In employing the compounds of this invention as microbiocides, it is sometimes unnecessary to use a completely pure product. In such cases, the filtration, concentration, and recrystallization steps can be eliminated and the entire reaction mixture can be formulated and used as such.

The compounds of this invention possess outstanding fungicidal activity. They can be used to control such turf diseases as dollar spot (*Sclerotinia homoeocarpa*), brown patch (*Pellicularia filamentosa*), snow mold (*Fusarium nivale*), copper spot (*Gloeocercospara sorghi*), and blight caused by Helminthosporium spp. The compounds of this invention are particularly useful for the control of fungi on golf-course turf. They are also useful as soil fungicides against such organisms as *Rhizoctonia solani*, Pythium spp., and Fusarium spp.

The compounds can be used as seed disinfectants or seed protectants for the seeds of wheat, oats, cotton, barley, flax, sorghum, rice, and the like. When applied to seeds, the compounds of this invention protect them, while germinating, from attack by soil-borne pathogens such as those belonging to the classes Pythium and Rhizoctonia. The compounds also disinfect seeds already infected with such seed-borne fungus diseases as stinking smut of wheat (*Pilletia caries*), loose smut of oats (*Ustilago avenae*), *Helminthosporium victoriae* on oats, and anthracnose of cotton (*Glomerella gossypii*).

The compounds of this invention are also useful as foliar fungicides on ornamental and fruit trees, and can be used to combat such diseases as apple scab (*Venturia inaequalis*) and anthracnose on sycamores (*Gromonia venta*).

The compounds of this invention show very low phytotoxicity coupled with a high degree of microbiocidal activity. In addition, the compounds of this invention are volatile, which makes them more effective as seed fungicides. Fungi carried on the seed, under seed hulls, and in breaks in the seed coat are reached by the vapors of the compounds and destroyed. After application to seed, a compound of this invention will redistribute itself over the entire seed surface, thus making the treatment more uniform.

The compounds of this invention can be used to control slime-forming organisms in wood pulping processes. They are also useful in preserving proteinaceous, fatty, and carbohydrate materials against fungus attack. Such materials as starch, animal and vegetable glues, oil-based paints, and lumber can be protected from fungus attack by applying a composition according to this invention.

The compounds of this invention can be formulated into a variety of compositions. They can, for example, be made up as solutions containing from 1 to 25% of active ingredient, or mixtures of active ingredients, 2 to 10% being the preferred range. The solutions can be made up using such solvents as dimethylformamide, dimethylacetamide, N-methylpyrrolidone, cyclohexanone, or other highly polar solvents. Such compositions have the advantage of adhering very well to the surfaces being treated and resisting removal by water and abrasion. Furthermore, such solvent-base compositions tend to penetrate surfaces treated and therefore destroy fungi more effectively. The particular solvent used in any given formulation must be one which has no deleterious effect on the substance being treated. For example, when seeds are being treated, a solvent must be used which is not phytotoxic to seeds. For this purpose, such solvents as dimethylformamide, dimethylacetamide, cyclohexanone, or N-methylpyrrolidone can be used.

Diluents or extenders for the solvent compositions can also be used. These can be chosen from among the common organic solvents. For example, hydrocarbon solvents such as benzene, xylene, or methylated naphthalenes can be used. Ketones such as diacetone alcohol, cyclohexanone, mesityl oxide, or isophorone can also be used. Also useful as extenders or diluents are such esters as ethyl acetate; branched chain alcohols such as isopropanol or 3-hexanol; ether-alcohols such as 2($\beta$-butoxyethoxy) ethanol; ethers such as phenolic ethers or diisoamyl ether; and cyclic nitrogen compounds such as pyridine.

Some of the compounds of this invention, especially those wherein the $R_2$ position is substituted with a metal ion, an ammonium ion, or an alkyl-substituted ammonium ion, are water-soluble. When these compounds are formulated in water-miscible solvents such as dimethylformamide or N-methylpyrrolidone, the formulations can be extended with water. Such compositions are useful in treating seeds, or in foliar applications.

Concentrates suitable for the preparation of aqueous emulsions, the so-called emulsifiable oil concentrates, can be prepared by adding a dispersing or emulsifying agent to a solution of the compounds of this invention in water-immiscible solvents such as cyclohexanone. Such dispersing and emulsifying agents are listed in detail in Bulletin E–607 of the Bureau of Entomology and Plant Quarantine of the U.S. Department of Agriculture and in articles by McCutcheon in "Soap and Sanitary Chemicals," December 1957 and January, February, March, April 1958.

Suitable emulsifying agents are such polyoxyethylene derivatives as polyoxyethylene ethers of alkylated phenols, polyoxyethylene esters of mixed rosin and fatty acids, and polyoxyethylene ethers of sorbitan fatty acid esters. Mixtures of these nonionic emulsifiers with anionic emulsifiers such as sulfonated oils are also very suitable emulsifier systems.

The dispersing or emulsifying agent is preferably one which is soluble in the solution. Ordinarily, the agent will not comprise more than 10% by weight of the emulsifiable oil composition. With some materials the percentage will be 5% or less.

Dust or powder compositions containing the compounds of this invention can also be prepared. These compositions contain the active material adsorbed on finely divided carriers or dusts such as natural clays, talc, diatomaceous earth, walnut shell flour, redwood flour, synthetic fine silica, calcium silicate, and other solid inert carriers customarily used in preparing compositions in dust form.

Such dusts can be converted to water-wettable powders by the usual expedient of including a surface-active agent of the wetting or dispersing type. These materials cause the compositions to disperse easily in water to give aqueous sprays. The surface-active agents employed can be of the anionic, cationic, or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in articles by McCutcheon in "Soap and Chemical Specialties," December 1957 and January, February, March, and April 1958.

Those compounds of this invention which are soluble in water can be prepared as water-soluble powders. In addition to the active ingredient, these powders can contain such diluents as sodium or potassium carbonate, sodium or potassium sulfate, sodium chloride, soluble phosphates, soluble borates, and soluble nitrates. These powders can also contain corrosion inhibitors such as sodium nitrite, wetting agents such as alkyl aryl sulfonates, and gums such as methyl cellulose.

The compositions of this invention can also contain a dye. This dye is especially useful in compositions to be used in the treatment of seeds, since it provides a means for clearly marking those seeds which have been treated. Xanthene dyes such as Rhodamine B or Rhodamine B extra, cationic azo dyes such as Sevron Red, or oil-soluble dyes such as Spirit Soluble Red can be used.

The compositions of this invention can contain almost any percentage of active compound. Since the exact amount to be used will depend on such factors as the particular disease being treated, the substance being treated, and climatic factors, it is not possible to indicate the exact amount to be used. Generally, however, the compositions of this invention will contain not less than .05% nor more than 95% by weight of active compounds.

This invention will be better understood by referring to the following illustrative examples.

EXAMPLE 1

*Preparation of 1-ethylmercurithio-2-ethylmercurithio-1,2-ethylenedicarbonitrile*

A solution of 14.4 parts of ethylmercuri acetate in 100 parts of water is added dropwise, with stirring, to a solution of 4.65 parts by weight of 1,2-dimercapto-1,2-ethylenedicarbonitrile, disodium salt in 50 parts of water. The resulting yellow precipitate is then filtered, slurried, washed with water, and air-dried to give 8.3 parts of the desired product, melting at 118°–122° C.

The procedure of this example can also be used to prepare the compounds in the following table, by substituting the listed organomercuri acetates for the ethylmercuri acetate used above.

EXAMPLE 17

*Preparation of 1-Ethylmercurithio-2-Methylmercurithio-1,2-Ethylenedicarbonitrile*

A solution of 14.4 parts of ethylmercuri acetate in 50 parts of water is added dropwise, with stirring, to a solution of 9.3 parts of 1,2-dimercapto-1,2-ethylenedicarbonitrile, sodium salt in 100 parts of water. To this solution is then added, dropwise and with stirring, a solution of 13.7 parts of methylmercuri acetate in 50 parts of water. The resulting yellow precipitate is filtered off, slurried, and washed with water. It is then air-dried and dissolved in acetone. The insoluble impurities are filtered off and the acetone is then removed in vacuo, to yield 16 parts of the desired product, melting at 109°–112° C.

The procedure of this example can also be used to prepare the compounds listed in the following table, by substituting listed organomercuri acetates for the ethylmercuri acetate and methylmercuri acetate used above.

| Example | Organomercuri acetate | Parts by Weight | Organomercuri acetate | Parts by Weight | Name of Product |
|---|---|---|---|---|---|
| 18 | ethyl- | 14.4 | allyl- | 15.0 | 1-ethylmercurithio-2-allylmercurithio-1,2-ethylenedicarbonitrile. |
| 19 | methyl- | 13.7 | isopropyl- | 15.1 | 1-methylmercurithio-2-isopropylmercurithio-1,2-ethylenedicarbonitrile. |
| 20 | cyclohexyl- | 17.1 | ethyl- | 14.4 | 1-cyclohexylmercurithio-2-ethylmercurithio-1,2-ethylenedicarbonitrile. |
| 21 | ethyl- | 14.4 | phenyl- | 16.8 | 1-ethylmercurithio-2-phenylmercurithio-1,2-ethylenedicarbonitrile. |
| 22 | methyl- | 13.7 | 5-chloro-2-aminophenyl- | 19.2 | 1-methylmercurithio-2-(5-chloro-2-aminophenyl)mercurithio-1,2-ethylenedicarbonitrile. |
| 23 | isopropyl- | 15.1 | dodecyl- | 21.9 | 1-isopropylmercurithio-2-dodecylmercurithio-1,2-ethylenedicarbonitrile. |
| 24 | 2-methoxyethyl- | 15.9 | cyclohexyl- | 17.1 | 1-(2-methoxyethyl)mercurithio-2-cyclohexylmercurithio-1,2-ethylenedicarbonitrile. |
| 25 | 2-hydroxyphenyl- | 17.6 | ethyl- | 14.4 | 1-(2-hydroxyphenyl)mercurithio-2-ethylmercurithio-1,2-ethylenedicarbonitrile. |
| 26 | propyl- | 15.1 | p-tolyl- | 17.5 | 1-propylmercurithio-2-(p-tolyl)mercurithio-1,2-ethylenedicarbonitrile. |
| 27 | ethyl- | 14.4 | n-octyl- | 19.1 | 1-ethylmercurithio-2-(n-octyl)mercurithio-1,2-ethylenedicarbonitrile. |

| Example | Organomercuri acetate | Parts by Weight | Product |
|---|---|---|---|
| 2 | methyl- | 10.96 | 1-methylmercurithio-2-methylmercurithio-1,2-ethylenedicarbonitrile. |
| 3 | phenyl- | 33.60 | 1-phenylmercurithio-2-phenylmercurithio-1,2-ethylenedicarbonitrile. |
| 4 | propyl- | 15.10 | 1-propylmercurithio-2-propylmercurithio-1,2-ethylenedicarbonitrile. |
| 5 | isopropyl- | 15.10 | 1-isopropylmercurithio-2-isopropylmercurithio-1,2-ethylenedicarbonitrile. |
| 6 | allyl- | 15.00 | 1-allylmercurithio-2-allylmercurithio-1,2-ethylenedicarbonitrile. |
| 7 | butyl- | 15.80 | 1-butylmercurithio-2-butylmercurithio-1,2-ethylenedicarbonitrile. |
| 8 | isobutyl- | 15.80 | 1-isobutylmercurithio-2-isobutylmercurithio-1,2-ethylenedicarbonitrile. |
| 9 | t-butyl- | 15.80 | 1-t-butylmercurithio-2-t-butylmercurithio-1,2-ethylenedicarbonitrile. |
| 10 | cyclohexyl- | 17.10 | 1-cyclohexylmercurithio-2-cyclohexylmercurithio-1,2-ethylenedicarbonitrile. |
| 11 | n-hexyl- | 17.20 | 1-n-hexylmercurithio-2-n-hexylmercurithio-1,2-ethylenedicarbonitrile. |
| 12 | n-octyl- | 19.10 | 1-n-octylmercurithio-2-n-octylmercurithio-1,2-ethylenedicarbonitrile. |
| 13 | dodecyl- | 21.90 | 1-dodecylmercurithio-2-dodecylmercurithio-1,2-ethylenedicarbonitrile. |
| 14 | 2-hydroxyphenyl- | 17.60 | 1-(2-hydroxyphenyl)mercurithio-2-(2-hydroxyphenyl)mercurithio-1,2-ethylenedicarbonitrile. |
| 15 | 5-chloro-2-aminophenyl- | 19.20 | 1-(5-chloro-2-aminophenyl)mercurithio-2-(5-chloro-2-aminophenyl)mercurithio-1,2-ethylenedicarbonitrile. |
| 16 | 2-methoxyethyl- | 15.90 | 1-(2-methoxyethyl)mercurithio-2-(2-methoxyethyl)mercurithio-1,2-ethylenedicarbonitrile. |

EXAMPLE 28

*Preparation of 1-Ethylmercurithio-2-Ethylthio-1,2-Ethylenedicarbonitrile*

To a solution of 9.3 parts by weight of 1,2-dimercapto-1,2-ethylenedicarbonitrile, disodium salt in 100 parts of absolute methanol are added 13.2 parts of ethylmercuri chloride. The mixture is stirred at room temperature for 1 hour. With continued stirring, 7.8 parts of iodoethane are then added. The mixture is stirred an additional hour, and the NaCl and NaI which formed are filtered from the reaction mixture. The solvent is removed from the filtrate in vacuo. The residue is dissolved in acetone and the insoluble sodium iodide and chloride are filtered off. The solvent is removed from the filtrate in vacuo to yield 1 - ethylmercurithio-2-ethylthio-1,2-ethylenedicarbonitrile in essentially pure form.

The procedure of this example can also be used to prepare the compounds listed in the following table, by substituting the listed organomercuri chlorides and organohalides for the ethylmercuri chloride and iodoethane used above.

| Example | Organomercuri chloride | Parts by Weight | Organohalide | Parts by Weight | Name of Product |
|---|---|---|---|---|---|
| 29 | cyclohexyl- | 15.9 | allylchloride | 3.8 | 1-cyclohexylmercurithio-2-allylthio-1,2-ethylenedicarbonitrile. |
| 30 | ethyl- | 13.2 | ethylenechlorohydrin. | 4.0 | 1-ethylmercurithio-2-(2-hydroxyethyl)thio-1,2-ethylenedicarbonitrile. |
| 31 | isopropyl- | 13.9 | chloroethane | 3.2 | 1-isopropylmercurithio-2-ethylthio-1,2-ethylenedicarbonitrile. |
| 32 | allyl- | 13.8 | 2-methoxyethylchloride. | 4.7 | 1-allylmercurithio-2-(2-methoxyethyl)thio-1,2-ethylenedicarbonitrile. |
| 33 | octyl- | 17.9 | 3,4-dichlorobenzylchloride. | 9.7 | 1-octylmercurithio-2-(3,4-dichlorotolyl)thio-1,2-ethylenedicarbonitrile. |
| 34 | dodecyl- | 20.7 | ethylenechlorohydrin. | 4.0 | 1-dodecylmercurithio-2-(2-hydroxyethyl)thio-1,2-ethylenedicarbonitrile. |
| 35 | phenyl- | 15.6 | acetylchloride | 3.9 | 1-phenylmercurithio-2-acetylthio-1,2-ethylenedicarbonitrile. |
| 36 | p-tolyl- | 16.3 | ethylchloroacetate. | 6.1 | 1-p-tolylmercurithio-2-ethylcarboxymethylenethio-1,2-ethylenedicarbonitrile. |
| 37 | 5-chloro-2-aminophenyl-. | 18.0 | N,N-dimethylcarbamyl chloride. | 5.3 | 1-(5-chloro-2-aminophenyl)mercurithio-2-(N,N-dimethylcarbamyl)thio-1,2-ethylenedicarbonitrile. |
| 38 | n-propyl- | 13.9 | trichloromethane sulfenyl chloride. | 9.3 | 1-n-propylmercurithio-2-trichloromethyldithio-1,2-ethylenedicarbonitrile. |
| 39 | 2-hydroxyphenyl- | 16.4 | ethylene chlorohydrin. | 4.0 | 1-(2-hydroxyphenyl)mercurithio-2-(2-hydroxyethyl)thio-1,2-ethylenedicarbonitrile. |

EXAMPLE 40

*Preparation of 1-Ethylmercurithio-2-Mercapto-1,2-Ethylenedicarbonitrile, Sodium Salt*

To a solution of 9.3 parts by weight of 1,2-dimercapto-1,2-ethylenedicarbonitrile, disodium salt in 50 parts of absolute methanol is added 13.2 parts by weight of ethylmercuri chloride. The mixture is stirred for 1 hour at room temperature. The sodium chloride which forms is filtered off and the solvent is removed from the filtrate in vacuo, to yield essentially pure 1-ethylmercurithio-2-mercapto-1,2-ethylenedicarbonitrile, sodium salt.

The procedure of this example can also be used to prepare the compounds listed in the following table, by substituting a listed organomercuri chloride for the ethylmercuri chloride used above.

| Example | Organomercuri chloride | Parts by Weight | Name of Product |
|---|---|---|---|
| 41 | methyl- | 12.5 | 1-methylmercurithio-2-mercapto-1,2-ethylenedicarbonitrile, sodium salt. |
| 42 | n-propyl- | 13.9 | 1-n-propylmercurithio-2-mercapto-1,2-ethylenedicarbonitrile, sodium salt. |
| 43 | isopropyl- | 13.9 | 1-isopropylmercurithio-2-mercapto-1,2-ethylenedicarbonitrile, sodium salt. |
| 44 | allyl- | 13.8 | 1-allylmercurithio-2-mercapto-1,2-ethylenedicarbonitrile, sodium salt. |
| 45 | cyclohexyl- | 15.9 | 1-cyclohexylmercurithio-2-mercapto-1,2-ethylenedicarbonitrile, sodium salt. |
| 46 | octyl- | 17.9 | 1-octylmercurithio-2-mercapto-1,2-ethylenedicarbonitrile, sodium salt. |
| 47 | dodecyl- | 20.7 | 1-dodecylmercurithio-2-mercapto-1,2-ethylenedicarbonitrile, sodium salt. |
| 48 | phenyl- | 15.6 | 1-phenylmercurithio-2-mercapto-1,2-ethylenedicarbonitrile, sodium salt. |
| 49 | p-tolyl- | 16.3 | 1-p-tolylmercurithio-2-mercapto-1,2-ethylenedicarbonitrile, sodium salt. |
| 50 | 5-chloro-2-aminophenyl-. | 18.0 | 1-(5-chloro-2-aminophenyl)mercurithio-2-mercapto-1,2-ethylenedicarbonitrile, sodium salt. |
| 51 | 2-hydroxyphenyl-. | 16.4 | 1-(2-hydroxyphenyl)mercurithio-2-mercapto-1,2-ethylenedicarbonitrile, sodium salt. |

EXAMPLE 52

*Preparation of 1-Ethylmercurithio-2-Mercapto-1,2-Ethylenedicarbonitrile, Hemizinc Salt*

A methanolic solution of 1-ethylmercurithio-2-mercapto-1,2-ethylenedicarbonitrile, sodium salt is prepared as described in Example 40. To this solution is then added 3.4 parts by weight of zinc chloride. Stirring is continued for 1 hour. The sodium chloride which forms is filtered off. The solvent is removed from the filtrate, in vacuo, to yield essentially pure 1-ethylmercurithio-2-mercapto-1,2-ethylenedicarbonitrile, hemizinc salt.

The procedure of this example can also be used to prepare the compounds listed in the following table, by substituting a listed metal salt and a listed organomercuri chloride for the ethylmercuri chloride and zinc chloride used above.

| Example | Organomercuri chloride | Parts by Weight | Metallic Salt | Parts by Weight | Name of Product |
|---|---|---|---|---|---|
| 53 | methyl- | 12.5 | $FeCl_2 \cdot 4H_2O$ | 9.9 | 1-methylmercurithio-2-mercapto-1,2-ethylenedicarbonitrile, ½ ferro salt. |
| 54 | n-propyl- | 13.9 | $CuCl_2 \cdot 2H_2O$ | 8.5 | 1-n-propylmercurithio-2-mercapto-1,2-ethylenedicarbonitrile, ½ cupri salt. |
| 55 | isopropyl- | 13.9 | $MnCl_2 \cdot 4H_2O$ | 9.9 | 1-isopropylmercurithio-2-mercapto-1,2-ethylenedicarbonitrile, ½ mangano salt. |
| 56 | allyl- | 13.8 | $CoCl_2 \cdot 6H_2O$ | 11.9 | 1-allylmercurithio-2-mercapto-1,2-ethylenedicarbonitrile, ½ cobalto salt. |
| 57 | cyclohexyl- | 15.9 | $NiCl_2 \cdot 6H_2O$ | 11.9 | 1-cyclohexylmercurithio-2-mercapto-1,2-ethylenedicarbonitrile, ½ nickelo salt. |
| 58 | octyl- | 17.9 | $CdCl_2$ | 9.1 | 1-octylmercurithio-2-mercapto-1,2-ethylenedicarbonitrile, ½ cadmium salt. |
| 59 | dodecyl- | 20.7 | $CrCl_3 \cdot 6H_2O$ | 8.9 | 1-dodecylmercurithio-2-mercapto-1,2-ethylenedicarbonitrile, ⅓ chromi salt. |
| 60 | phenyl- | 15.6 | $ZnCl_2$ | 6.8 | 1-phenylmercurithio-2-mercapto-1,2-ethylenedicarbonitrile, ½ zinc salt. |
| 61 | p-tolyl- | 16.3 | $CdCl_2$ | 9.1 | 1-p-tolylmercurithio-2-mercapto-1,2-ethylenedicarbonitrile, ½ cadmium salt. |
| 62 | 5-chloro-2-aminophenyl-. | 18.0 | $MnCl_2 \cdot 4H_2O$ | 9.9 | 1-(5-chloro-2-aminophenyl)mercurithio-2-mercapto-1,2-ethylenedicarbonitrile, ½ mangano salt. |
| 63 | 2-hydroxyphenyl- | 16.4 | $FeCl_3 \cdot 6H_2O$ | 9.0 | 1-(2-hydroxyphenyl)mercurithio-2-mercapto-1,2-ethylenedicarbonitrile, ⅓ ferri salt. |

EXAMPLE 64

*Preparation of 1-Ethylmercurithio-2-Mercapto-1,2-Ethylenedicarbonitrile, Ammonium Salt*

A methanolic solution of 1-ethylmercurithio-1,2-ethylenedicarbonitrile, sodium salt is prepared as described in Example 40. An "Amberlite" IR-120 ion exchange resin column is prepared in the ammonium form by standard procedures with a final column volume of 100 milliliters. The column is then given a final wash with two volumes of methanol. The methanolic solution is then put through the column at the rate of 0.1 volume per minute. The column is rinsed with 5 volumes of methanol at the rate of 0.1 volume per minute. The effluent and rinsings are combined and the solvent is removed in vacuo. This procedure yields essentially pure 1-ethylmercurithio - 2 - mercapto - 1,2 - ethylenedicarbonitrile, ammonium salt.

The procedure of this example can also be used to prepare the compounds listed in the following table, by substituting a listed organomercuri chloride and a listed ion for the ethylmercuri chloride and ammonium ion used above.

| Example | Organomercuri acetate | Parts by Weight | Name of Product |
|---|---|---|---|
| 77 | methyl- | 13.7 | 1,1'-dithiobis[2-methylmercurithio-1,2-ethylenedicarbonitrile]. |
| 78 | n-propyl- | 15.1 | 1,1'-dithiobis[2-n-propylmercurithio-1,2-ethylenedicarbonitrile]. |
| 79 | isopropyl- | 15.1 | 1,1'-dithiobis[2-isopropylmercurithio-1,2-ethylenedicarbonitrile]. |
| 80 | allyl- | 15.0 | 1,1'-dithiobis[2-allylmercurithio-1,2-ethylenedicarbonitrile]. |
| 81 | cyclohexyl- | 17.1 | 1,1'-dithiobis[2-cyclohexylmercurithio-1,2-ethylenedicarbonitrile]. |
| 82 | octyl- | 19.1 | 1,1'-dithiobis[2-octylmercurithio-1,2-ethylenedicarbonitrile]. |
| 83 | dodecyl- | 21.9 | 1,1'-dithiobis[2-dodecylmercurithio-1,2-ethylenedicarbonitrile]. |
| 84 | phenyl- | 16.8 | 1,1'-dithiobis[2-phenylmercurithio-1,2-ethylenedicarbonitrile]. |
| 85 | p-tolyl- | 17.5 | 1,1'-dithiobis[2-p-tolylmercurithio-1,2-ethylenedicarbonitrile]. |
| 86 | 5-chloro-2-aminophenyl-. | 19.2 | bis[1-(5-chloro-2-aminophenyl)-mercurithio-1,2-ethylenedicarbonitrile]sulfide. |
| 87 | 2-hydroxyphenyl-. | 17.6 | bis[1-(2-hydroxyphenyl)mercurithio-1,2-ethylenedicarbonitrile]sulfide. |

| Example | Organomercuri chloride | Parts by Weight | Ion on Resin | Name of Product |
|---|---|---|---|---|
| 65 | methyl- | 12.5 | $K^+$ | 1-methylmercurithio-2-mercapto-1,2-ethylenedicarbonitrile, potassium salt. |
| 66 | n-propyl- | 13.9 | $CH_3NH_3^+$ | 1-n-propylmercurithio-2-mercapto-1,2-ethylenedicarbonitrile, methylammonium salt. |
| 67 | isopropyl- | 13.9 | $(CH_3)_2NH_2^+$ | 1-isopropylmercurithio-2-mercapto-1,2-ethylenedicarbonitrile, dimethylammonium salt. |
| 68 | allyl- | 13.8 | $K^+$ | 1-allylmercurithio-2-mercapto-1,2-ethylenedicarbonitrile, potassium salt. |
| 69 | cyclohexyl- | 15.9 | $NH_4^+$ | 1-cyclohexylmercurithio-2-mercapto-1,2-ethylenedicarbonitrile, ammonium salt. |
| 70 | octyl- | 17.9 | $(CH_3)_2NH_2^+$ | 1-octylmercurithio-2-mercapto-1,2-ethylenedicarbonitrile, dimethylammonium salt. |
| 71 | dodecyl- | 20.7 | $NH_4^+$ | 1-dodecylmercurithio-2-mercapto-1,2-ethylenedicarbonitrile, ammonium salt. |
| 72 | phenyl- | 15.6 | $NH_4^+$ | 1-phenylmercurithio-2-mercapto-1,2-ethylenedicarbonitrile, ammonium salt. |
| 73 | p-tolyl- | 16.3 | $(CH_3)NH_3^+$ | 1-p-tolylmercurithio-2-mercapto-1,2-ethylenedicarbonitrile, dimethylammonium salt. |
| 74 | 5-chloro-2-aminophenyl-. | 18.0 | $NH_4^+$ | 1-(5-chloro-2-aminophenyl)mercurithio-2-mercapto-1,2-ethylenedicarbonitrile, ammonium salt. |
| 75 | 2-hydroxy-phenyl- | 16.4 | $(CH_3)_2NH_2^+$ | 1-(2-hydroxyphenyl)mercurithio-2-mercapto-1,2-ethylenedicarbonitrile, dimethylammonium salt. |

EXAMPLE 76

*Preparation of 1,1'-Dithiobis[2-Ethylmercurithio-1,2-Ethylenedicarbonitrile]*

A solution of 7 parts of ammonium persulfate in 50 parts of water is added dropwise, with stirring, to a solution of 9.3 parts of 1,2-dimercapto-1,2-ethylenedicarbonitrile, disodium salt in 150 parts of water in which 14.4 parts of ethylmercuriacetate has been dissolved. The reaction temperature is maintained at 20° C. Stirring is continued for 15 minutes, after which the resulting insoluble 1,1'-dithiobis[2-ethylmercurithio - 1,2 - ethylenedicarbonitrile] is removed by filtration. No further purification is necessary.

The procedure of this example can also be used to prepare the compounds listed in the following table by substituting a listed organomercuri acetate for the ethylmercuri acetate used above.

EXAMPLE 88

Solution: Percent
1 - ethylmercurithio - 2 - ethylmercurithio-1,2-ethylenedicarbonitrile _____ 3.22
N-methyl-2-pyrrolidone _____ 96.78

The active material is dissolved in the N-methyl-2-pyrrolidone. This formulation is then applied, at a concentration of 2 ounces of solution per hundredweight of seed, to seeds of Victor oats infected with *Helminthosporium victoriae*. The emerging seedlings are examined 12 days after planting. They appear healthy, with no evidence of mercury injury.

EXAMPLE 89

Solution: Percent
1-methylmercurithio-2-methylmercurithio - 1,2-ethylenedicarbonitrile _____ 3.31
"Sevron" Red dye _____ 1.00
Dimethylformamide _____ 95.69

The active material and dye are dissolved in the dimethylformamide.

This composition is then applied to acid-delinted cotton seed at 2.0 fluid ounces per hundredweight. The seed is planted in loamy soil infected with a variety of soil-borne pathogens. It will be observed that the number of emerging seedlings is more than three times as great as that obtained with untreated cotton seed used as a control.

EXAMPLE 90

Solution: Grams
- 1 - methylmercurithio - 2 - methylmercurithio-1,2-ethylenedicarbonitrile _____ 2
- 1 - ethylmercurithio - 2 - ethylmercurithio - 1,2-ethylenedicarbonitrile _____ 2
- N-methyl-2-pyrrolidone to make 100 milliliters of solution.

The solution is prepared by dissolving the compounds in the solvent. This solution is then applied to Selkirk wheat seeds at a concentration of 1 ounce per hundred pounds of seed, and to machine-delinted cotton seed at a concentration of 2 ounces per hundred pounds, by tumbling the seed and solution together until uniform coverage is obtained. The seeds are planted and the wheat seed is held at 50° F. for 6 days to allow soil-borne pathogens to act. The cotton seed is not chilled. The seeds are then allowed to germinate. The number of treated seeds which germinate is significantly greater than the number of control seeds which germinate. There is no evidence of injury due to treatment.

EXAMPLE 91

Emulsifiable oil: Percent
- 1-allylmercurithio-2-propylthio - 1,2 - ethylenedicarbonitrile_____ 10
- Polyoxyethylene ethers plus oil soluble sulfonates_ 5
- Cyclohexanone_____ 85

The 1-ethylmercurithio-2-propyl-1,2-ethylenedicarbonitrile is dissolved in the cyclohexanone. When solution is complete, the polyalkylaryl carboxylic acid ethers plus oil soluble sulfonates are added.

This formulation, applied to apple (*Pyrus malus*) and hawthorn (*Crataegus* spp.) as a foliage spray at a concentration of 0.15% of the formulation emulsified in water, gives good control of scab caused by *Venturia inaequalis*.

EXAMPLE 92

Wettable powder: Percent
- 1 - phenylmercurithio-2-butylthio-1,2-ethylenedicarbonitrile _____ 40.0
- Sodium alkyl naphthalene sulfonates_____ .5
- Sodium lignin sulfonates_____ .5
- Attapulgite clay _____ 59.0

All the ingredients are blended and micropulverized to a fine powder. The ground material is then reblended.

When this formulation is applied to American elm (*Ulmus americana*) as a foliage spray at a concentration of 0.04% of the formulation, dispersed in water, good control of black spot caused by *Gromonia ulmea* is obtained.

EXAMPLE 93

Wettable powder: Percent
- 1-ethylmercurithio - 2 - (2-hydroxyphenyl)thio-1,2-ethylenedicarbonitrile_____ 45.0
- Partially desulfonated sodium lignin sulfonates_ 1.0
- Sodium lauryl sulfate_____ 0.5
- Kaolin clay_____ 47.5
- Orange G dye_____ 6.0

All ingredients are blended into a uniform mixture. The mixture is then micropulverized to a fine powder and reblended.

When slurried in water and applied to oat seeds at a concentration of 0.137 ounce per hundredweight of seed, this formulation gives a healthy stand of oats free of fungus infection.

EXAMPLE 94

Wettable powder: Percent
- 1-propylmercurithio - 2 - propylmercurithio-1,2-ethylenedicarbonitrile _____ 40.0
- Polyethylene oxide modified esters of tall oil acids concreted with urea_____ 5.0
- Synthetic calcium silicate_____ 47.0
- Rhodamine dye_____ 8.0

All the ingredients are blended together, micropulverized, and then reblended.

When slurried in water and applied to barley seed at 0.2 ounce of active ingredient per bushel, a good stand of barley, free of fungus, is obtained.

EXAMPLE 95

Water-extendable solution: Percent
- 1-dodecylmercurithio - 2 - mercapto-1,2-ethylenedicarbonitrile, ammonium salt_____ 10
- Dimethylformamide _____ 47
- Water _____ 43

This formulation is prepared by dissolving the 1-dodecylmercurithio-2-mercapto - 1,2 - ethylenedicarbonitrile in the dimethylformamide-water mixture.

When applied to the run-off point to pear trees (*Pyrus communis*) as a foliage spray at a concentration of 0.2% of the formulation dissolved in water, good control of scab caused by *Venturia pyrina* is obtained.

EXAMPLE 96

Water-extendable solution: Percent
- 1-n-octylmercurithio - 2 - mercapto-1,2-ethylene dicarbonitrile, sodium salt_____ 5.0
- Ethyl Cellosolve_____ 95.0

The active material is dissolved in the ethyl cellosolve.

When this composition is applied to walnut trees (*Juglans nigua*) as a foliage spray at a concentration of 0.3% of the formulation in water, good control of leaf spot caused by *Marssonina juglandis* is obtained.

EXAMPLE 97

Aqueous dispersion: Percent
- 1-cyclohexylmercurithio - 2 - (2,4-dinitrophenyl)-thio-1,2-ethylenedicarbonitrile _____ 2.0
- Hydrated attapulgite clay_____ 2.0
- Sodium lignin sulfonate_____ 5.0
- "Rhodamine" dye_____ 7.0
- Water _____ 56.0

The ingredients are ground together in a pebble mill or sand grinder until all particles are substantially less than 5 microns in size.

When extended with water and applied to sorghum seeds at 0.2 ounce of formulation per hundredweight, this composition protects the seeds from attack by soil-borne pathogens, so that a healthy stand of seedlings is obtained.

EXAMPLE 98

*Control of Turf Diseases*

Four ounces of the emulsifiable oil formulation of Example 91 is diluted with water to a total volume of 5 gallons. This is then sprayed at weekly intervals during the growing season on 1,000 square feet of turf containing Kentucky bluegrass, creeping red fescue, and Astoria colonial bent grass. Complete control is obtained of such diseases as brown patch (*Pellicularia filamentosa*), dollar spot (*Sclerotinia homoeocarpa*), copper spot (*Gloeocercospara sorghi*), and Helminthosporium blight (*Helminthosporium vogans*).

17

EXAMPLE 99

*Control of Soil-Borne Fungi*

One-half pound of the wettable powder composition described in Example 94 is diluted with water to a total volume of 10 gallons. This diluted preparation is then sprayed on a band 4 inches wide over one acre of open furrows containing cotton seed (approximately 12,000 linear feet of row). The spray is directed in such a way as to strike the sides of the furrow as well as the seed in the bottom of the furrow. The furrow is then closed, thus completing the planting operation.

The above treatment gives essentially 100% control of cotton seedling damage by such organisms as *Rhizoctonia solani*, Fusarium spp., Pythium spp., and Sclerotinia spp. which abound in cotton soils.

EXAMPLE 100

*Control of Slime*

Approximately 1½ ounces of the wettable powder formulation of Example 92, when added to one ton of dry fiber equivalent, at or before the point in a wood pulping process where slime forms, will effectively control slime-producing organisms.

These organisms can also be controlled by metering into the process, at or before the point where slime forms, the water extendable liquid formulation of Example 95. Addition is regulated so as to give a final concentration of from 5 to 10 ounces of concentrate per ton of dry fiber equivalent.

EXAMPLE 101

*Preservation of Paper Coating and Wood Pulp*

Paper coating stock and wood pulp can be preserved by the addition of from 1½ to 3 ounces of the wettable powder formulation of Example 94 per ton of coating stock or dry fiber.

EXAMPLE 102

*Preservation of Carbohydrate, Protein, and Lipid Containing Materials*

Starches can be preserved by blending from .01% to .1% of the wettable powder formulation of Example 94 into the product.

A similar concentration of the same formulation, blended into vegetable and animal glues and other solid proteinaceous materials, will stop the attack of these materials by fungi.

Oil-based paints and substrates to which they are applied can be protected from fungus attack by blending from .02% to 4% of the emulsifiable oil formulation of Example 91 into the final paint or the pigment vehicle. Protection can also be obtained by the addition to the pigment of from 0.01% to 1.0% of a compound listed in Examples 1 through 27.

18

The invention claimed is:
1. A compound of the formula

$$R_1Hg-S-(CN)C=C(CN)-S-R_2$$

where $R_1$ is selected from the group consisting of aliphatic hydrocarbon radicals of 1 through 12 carbon atoms and such radicals substituted with at least one member selected from the group consisting of —NO$_2$, —OH, OCH$_3$, —NH$_2$, —CN, and —Cl; cycloaliphatic hydrocarbon radicals of 3 through 8 carbon atoms; phenyl; phenyl radicals substituted with at least one member selected from the group consisting of —Cl, —CH$_3$, —OH, —NO$_2$ and NH$_2$; acetyl; ethyl acetyl; β-chloro carbethoxy; N,N-dimethyl carbamyl; and ethyl carboxymethylene; and $R_2$ is selected from the group consisting of —R$_1$, —R$_1$Hg, R$_1$Hg—S—(CN)C=C(CN)—S—, —S—CCl$_3$, sodium, potassium, ½ barium, ½ iron, ⅓ iron, ½ calcium, ½ manganese, ⅓ manganese, ½ magnesium, ½ copper, ½ cadmium, ½ zinc, ½ cobalt, ⅓ cobalt, ½ nickel, ½ chromium, ⅓ chromium, ammonium, and alkyl substituted ammonium containing a total of 1 through 12 carbon atoms.

2. A microbicidal composition comprising a compound according to claim 1 and a major amount of an inert finely-divided dispersible solid.

3. A microbicidal composition comprising a compound according to claim 1 and a major amount of an inert liquid.

4. A microbicidal composition comprising a compound according to claim 1 and from 0.5% to 10%, by weight of a surface-active agent.

5. A method for the control of microorganisms, said method comprising the application, to the material to be protected, of a microbicidal amount of a compound of claim 1.

6. 1-ethylmercurithio-2-ethylmercurithio-1,2 - ethylenedicarbonitrile.

7. 1 - methylmercurithio-2-methylmercurithio-1,2-ethylenedicarbonitrile.

8. 1 - methylmercurithio-2-mercapto-1,2-ethylenedicarbonitrile, sodium salt.

9. 1 - ethylmercurithio-2-mercapto-1,2-ethylenedicarbonitrile, ammonium salt.

10. 1 - methylmercurithio-2-mercapto-1,2-ethylenedicarbonitrile, dimethyl ammonium salt.

References Cited in the file of this patent

UNITED STATES PATENTS

| | | |
|---|---|---|
| 2,289,590 | Ralston | July 14, 1942 |
| 2,571,095 | Altschul | Oct. 16, 1951 |
| 2,665,234 | Goodhue | Jan. 5, 1954 |
| 2,852,552 | Little | Sept. 16, 1958 |
| 2,925,432 | Drysdale | Feb. 16, 1960 |
| 2,953,588 | Westfahl | Sept. 20, 1960 |